United States Patent [19]
Akiyama et al.

[11] Patent Number: 6,132,073
[45] Date of Patent: Oct. 17, 2000

[54] HEADLAMP

[75] Inventors: Yoshiaki Akiyama; Masaki Takase; Toshikazu Iizuka, all of Tokyo, Japan

[73] Assignee: Stanley Electric Co., Ltd., Japan

[21] Appl. No.: 09/206,528

[22] Filed: Dec. 7, 1998

[30] Foreign Application Priority Data

Dec. 8, 1997 [JP] Japan ..................................... 9-337327

[51] Int. Cl.[7] .............................................. F21W 101/02
[52] U.S. Cl. ........................... 362/529; 362/289; 362/428
[58] Field of Search ................................... 362/289, 287, 362/523, 529, 530, 419, 421, 428

[56] References Cited

U.S. PATENT DOCUMENTS 5,032,964  7/1991  Endo et al. ................................. 362/61
5,183,331  2/1993  Edgell et al. ............................. 362/426
5,351,170  9/1994  Nagengast et al. ........................ 362/66

*Primary Examiner*—Laura K. Tso
*Attorney, Agent, or Firm*—Ostrolenk, Faber, Gerb & Soffen, LLP

[57] ABSTRACT

A headlamp comprises an aiming adjustment device having an adjusting element for allowing the aiming adjustment, and an adjustment prevention mechanism for preventing any aiming adjustment by unauthorized workers. The adjustment prevention mechanism comprises an external rib which, having a tool insertion hole, forms part of a headlamp assembly and surrounds the adjusting element, and a cover member of which external wall fits to an internal wall of the external rib. Installation of the adjustment prevention mechanism is possible by means of a simple operation, namely, just by pushing the cover member into the external rib. The cover member is formed similarly to a cap so that the cover member covers all openings on the external rib. In addition, the cover member is provided with a fitting means to the adjusting element or the external rib, making it impossible to remove the cover member after it is mounted.

10 Claims, 3 Drawing Sheets

HEADLAMP

BACKGROUND OF THE INVENTION

1. Field of the Invention

The present invention relates to a motor vehicle headlamp, and, more particularly, to a motor vehicle headlamp comprising an aiming adjustment device which is provided with an adjustment prevention mechanism to prevent any change of the aiming adjustment of the headlamp after shipment from the manufacturer that was completed during a manufacturing process.

2. Background Art

FIG. 5 shows a conventional headlamp 90 and an automotive body 30. Since a manufacturing error is inevitable on the headlamp 90 after the headlamp 90 is manufactured, some adjustments are required after the headlamp 90 is mounted on the automotive body 30 so that a specified beam direction can be obtained.

Accordingly, the headlamp 90 is equipped with an aiming adjustment device 91 that, for example, enables a reflector to be adjusted vertically and horizontally. An adjusting element 91a of said aiming adjustment device 91, for example, extends from an external surface of a housing 90a of the headlamp 90 to allow for adjustment of headlamp 90 after headlamp 90 is mounted on the automotive vehicle. Thus, the headlamp 90 can be easily adjusted from the outside of housing 90a after the headlamp 90 is mounted on the automotive vehicle.

However, if the adjusting element 91a is extended to the external surface of the housing 90a and is exposed as mentioned above, even a user of the automotive vehicle is capable of adjusting headlamp 90. This allows for the possibility of improper adjustment by users who do not have full and accurate knowledge about aiming. Depending on destination countries, some standards require an adjustment prevention mechanism 92 disposed so as to prevent users from manipulating the adjusting element 91a.

The conventional adjustment prevention mechanism 92 consists of a cover 92a for covering said adjusting element 91a and a mounting screw 92b (or a rivet depending on the case used) for fixing the cover 92a on the housing 90a. After completion of the aiming adjustment, the manufacturer mounts the cover 92a with the mounting screw 92b to prevent any adjustment thereafter.

When the headlamp 90 is mounted on an actual automotive body 30, however, in most cases almost no gap is left between the housing 90a and the automotive body 30, as is shown in FIG. 5. After completion of the aiming adjustment, there hardly remains a workspace for mounting said cover 92a of the adjustment prevention mechanism 92 and fixing the mounting screw 92b. Even if said cover 92a can be mounted, the prior art for mounting adjustment prevention mechanisms has often created one or more collateral problems including:

(a) unavailability of a workspace for manipulating a tool such as a screw driver for fixing said mounting screw 92b;

(b) a need for special apparatus and tools;

(c) a need for welding the cover 92a;

(d) a decrease in the productivity; and/or (e) an increase in production costs.

SUMMARY OF THE INVENTION

An object of the present invention is to provide a headlamp which drastically increases the productivity and decreases costs by facilitating installation of an adjustment prevention mechanism by means of a simple push-in procedure in contrast to the prior art which makes it difficult to mount the adjustment prevention mechanism due to an insufficient workspace available after completion of the aiming adjustment.

An aspect of the present invention based on the above-mentioned object is to provide a headlamp comprising an aiming adjustment device having an adjusting element, and an adjustment prevention mechanism for preventing any aiming adjustment by unauthorized workers, wherein said adjustment prevention mechanism comprises:

an external rib which, having a tool insertion hole, forms part of a headlamp assembly and surrounds said adjusting element, and a cover member of which external wall fits to an internal wall of said external rib.

The aforementioned structure allows secure mounting of the adjustment prevention mechanism after completion of the aiming adjustment of the headlamp, thereby increasing the productivity.

It is another aspect of the present invention to provide said headlamp in which said cover member is in the form of a cap and covers all openings including said tool insertion hole on said external rib.

Providing the cover member in the form of a cap facilitates the installation thereof and provides improved productivity.

It is yet another aspect of the present invention to provide said headlamp in which said cover member has a means for fitting to said adjusting element or said external rib.

This structure provides secure fitting of the cover member after installation thereof, ensuring the operation of the adjustment prevention mechanism.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The present invention is described in detail hereinafter with reference to embodiments shown in the accompanying drawings.

Figure 1:
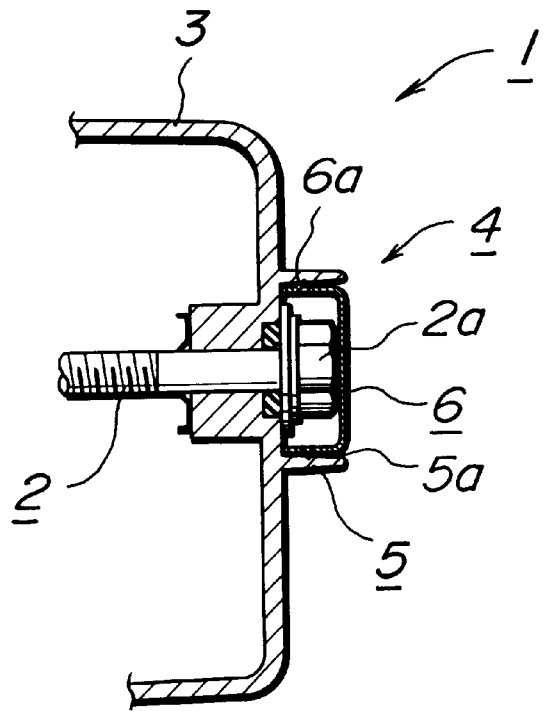
FIG. 1 is a fragmentary sectional view of an embodiment of the headlamp according to the present invention.

Referring to FIG. 1, reference numeral 1 designates a headlamp according to the present invention. The headlamp 1 is provided with an aiming adjustment device 2. An adjusting element 2a of said aiming adjustment device 2 is mounted on an external surface of a housing 3 of headlamp 1. This structure is same as that for a conventional headlamp.

More specifically, said adjusting element 2a is provided with an adjustment prevention mechanism 4 that prevents improper adjustments by users of an automotive vehicle. In the present invention, said adjustment prevention mechanism 4 comprises an external rib 5 and a cover member 6, thus simplifying performing the function of the adjustment prevention mechanism 4.

Said external rib 5 is formed, for example, on the external surface of the housing 3 where no movement occurs during adjustment of the aiming adjustment device 2 so that the external rib 5 surrounds said adjusting element 2a. In addition, the external rib 5 is provided with a tool insertion hole 5a to allow for a maintenance tool (not shown) to reach the adjusting element 2a.

In the first preferred embodiment of the present invention, said adjusting element 2a is formed as a hexagonal bolt for which a box wrench is a preferable tool. Accordingly, said external rib 5 per se can be seen as a quasi-pipe of which an end is provided with the tool insertion hole 5a. It should be noted that said external rib 5 can be molded integrally with the housing 3.

Said cover member 6 is separately manufactured so that the cover member 6 covers tool insertion hole 5a on said external rib 5. Accordingly, in the first preferred embodiment of the present invention, the cover member 6 is formed as a cap mounted inside the external rib 5 formed as a quasi-pipe. In the present invention, the external wall of the cover member 6 is fit on the internal wall of the external rib 5 to prevent easy removal and reinstallation of the cover member 6 on the market.

Figure 2:
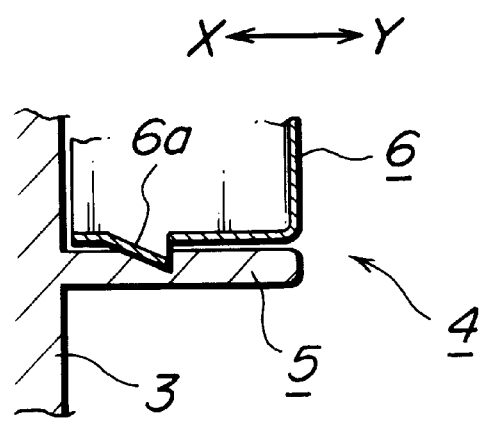
FIG. 2 is an enlarged fragmentary sectional view showing part of the headlamp illustrated in FIG. 1.

Further, in the first preferred embodiment, said cover member 6 is made of, for example, a metallic material. The cover member 6 is provided with a projection as a fitting means, protruding in the direction of an external diameter of cover member 6 by means of press working. In the first preferred embodiment of the present invention, the projection is formed as a fixing claw 6a for the external rib 5. As shown in FIG. 2, said fixing claw 6a has a gentle slant in the insertion direction X of the cover member 6 into an inside of the external rib 5 and has a right angle or a reverse slant in the extraction direction of Y, thus making removal the cover member 6 difficult.

Since the adjustment prevention mechanism 4 is structured as described above, the adjustment prevention mechanism 4 can be assembled very simply pushing the cover member 6 to the inside of the external rib 5 after the manufacturer has adjusted the aiming of the headlamp. Accordingly, the structure of the present invention eliminates the need for a workspace necessary in the conventional structure for accommodating a tool such as a screw driver, and decreases the work time.

Moreover, in the present invention, since the fixing claw 6a is provided in such a manner that the fixing claw 6a is positioned to the inner wall side of the external rib 5, once the cover member 6 is seated, it is very difficult to externally disengage the fixing claw 6a and the external rib 5 without destroying the external rib 5 or the cover member 6. Therefore, the function of the adjustment prevention mechanism 4 is ensured.

Figure 3:
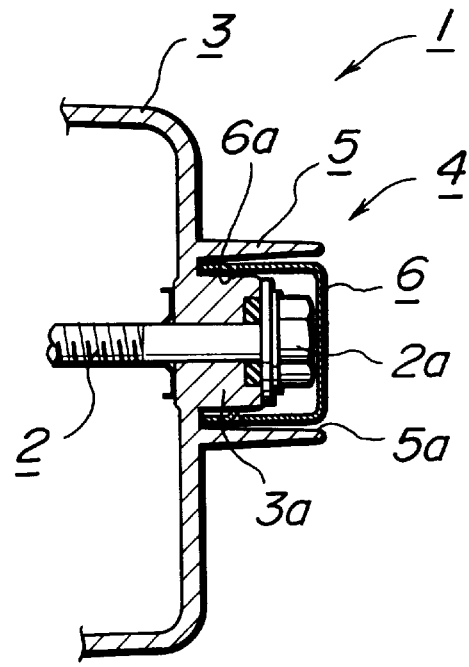
FIG. 3 is a fragmentary sectional view of another embodiment of the headlamp according to the present invention.

FIG. 3 shows another preferred embodiment of the present invention. In this preferred embodiment, a boss 3a is provided on an external surface of the housing 3 at the position where said adjusting element 2a is provided. In this case, said fixing claw 6a on said cover member 6 can be provided so that the fixing claw 6a fits to the side face of said boss 3a or to the inner wall surface of the external rib 5. In the present invention, an object to be fit with the cover member 6 is not limited as long as the cover member 6 can be securely fixed.

Figure 4:
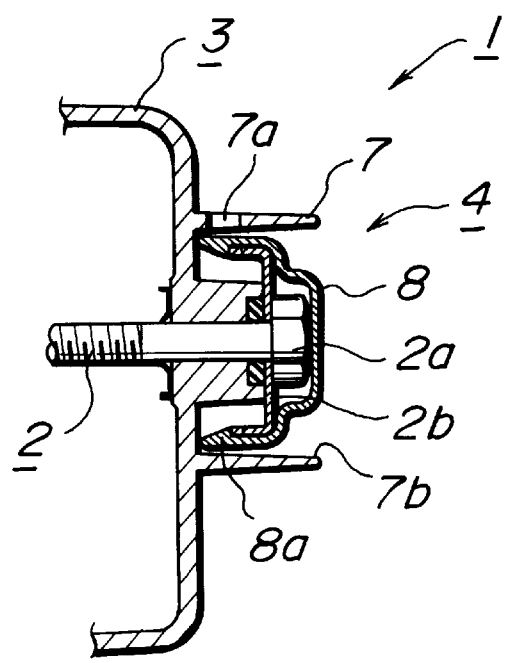
FIG. 4 is a fragmentary sectional view of still another embodiment of the headlamp according to the present invention.
Figure 5:
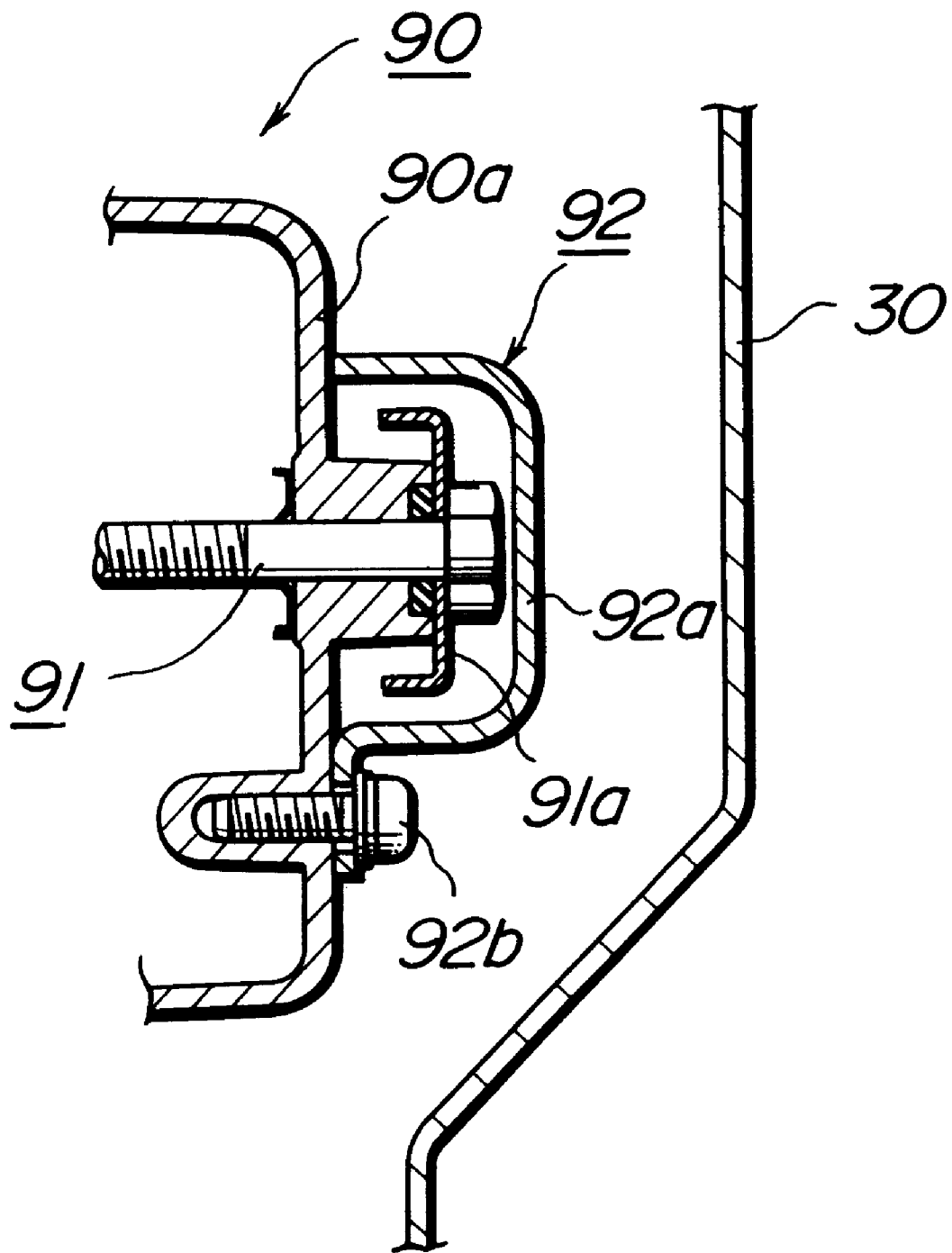
FIG. 5 is a fragmentary sectional view of a conventional headlamp.

FIG. 4 shows still another preferred embodiment of the present invention. In this preferred embodiment, said adjusting element 2a of said headlamp 1 is provided with a direction reversal gear 2b which is formed into a crown gear and engages a Phillips screw driver. In this case, the external rib 7 of the adjustment prevention mechanism 4 is formed into a quasi-pipe surrounding the adjusting element 2a similar to the above-mentioned preferred embodiments and is provided with a tool insertion hole 7a at a proper location on the side of the pipe shape.

Accordingly, the external rib 7 of this preferred embodiment has two openings, i.e., the tool insertion hole 7a located on the side of the external rib 7 and a top hole 7b at the top thereof which is used, for example, for assembling said adjusting element 2a. Consequently, the cover member 8 of this preferred embodiment is formed to have a depth large enough to cover both of these two openings described.

As described in the first preferred embodiment, said cover member 8 may be made of metallic material and be provided with a fixing claw which fits to the external rib 7 (see FIG. 1). In this preferred embodiment, however, the cover member 8 is made of a resin material and is provided with a fixing claw 8a which fits into said direction reversal gear 2b. This structure allows the cover member 8 to cover both of the tool insertion hole 7a and the top hole 7b simultaneously.

In other words, another object of the present invention is to fit the cover member 6 or 8 within the inside of the external rib 5 or 7 respectively, and to prevent disengagement of both these elements after shipment to the market. It will be appreciated that the cover member can be fit to any elements as long as said object is satisfied.

As discussed above, the present invention can achieve a remarkable effect on an increase in the productivity and a decrease in costs by facilitating installation of an adjustment prevention mechanism by means of a simple push-in procedure while the prior art makes it difficult to mount the adjustment prevention mechanism due to an insufficient work space available after completion of the aiming adjustment.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A headlamp comprising an aiming adjustment device having an adjusting element, and an adjustment prevention mechanism which prevents adjustment of an aim of said headlamp, said adjustment prevention mechanism comprising:

a rib extending from a housing of said headlamp, said rib surrounding said adjusting element and including an internal and an external wall and a tool insertion opening; and a cover member which covers said adjusting element, said cover member having an internal and an external wall, said external wall of said cover member being designed to fit within said internal wall of said rib.

2. A headlamp according to claim 1, wherein said cover member is in the form of a cap and covers said tool insertion opening.

3. A headlamp according to claim 1, wherein said cover member is mateable with said adjusting element.

4. A headlamp according to claim 2, wherein said cover member is mateable with said adjusting element.

5. A headlamp according to claim 1, wherein said cover member is mateable with said external rib.

6. A headlamp according to claim 2, wherein said cover member is mateable with said external rib.

7. A headlamp according to claim 3, wherein said cover member includes a fixing claw extending therefrom.

8. A headlamp according to claim 4, wherein said cover member includes a fixing claw extending therefrom.

9. A headlamp according to claim 5, wherein said cover member includes a fixing claw extending therefrom.

10. A headlamp according to claim 6, wherein said cover member includes a fixing claw extending therefrom.

* * * * *